United States Patent
Vas et al.

(10) Patent No.: US 7,243,552 B2
(45) Date of Patent: Jul. 17, 2007

(54) PRESSURE SENSOR ASSEMBLY

(75) Inventors: Timothy A. Vas, Kokomo, IN (US); Timothy M. Betzner, Kokomo, IN (US); Stephen P. Long, Tipton, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/124,832

(22) Filed: May 9, 2005

(65) Prior Publication Data

US 2006/0248957 A1    Nov. 9, 2006

(51) Int. Cl.
*G01L 9/00*    (2006.01)
(52) U.S. Cl. .................................... 73/754; 73/753
(58) Field of Classification Search .......... 73/700–756; 361/283.1–283.4
See application file for complete search history.

(56) References Cited

U.S. PATENT DOCUMENTS

| | | | |
|---|---|---|---|
| 5,220,838 A | | 6/1993 | Fung et al. |
| 5,349,491 A | * | 9/1994 | Obermeier ............... 361/283.4 |
| 5,522,267 A | * | 6/1996 | Lewis .......................... 73/726 |
| 5,661,245 A | | 8/1997 | Svoboda et al. |
| 5,740,594 A | * | 4/1998 | Lukasiewicz et al. ...... 29/25.41 |
| 6,122,973 A | * | 9/2000 | Nomura et al. ............... 73/724 |

FOREIGN PATENT DOCUMENTS

| | | |
|---|---|---|
| DE | 2630640 | 1/1977 |
| DE | 19830538 | 1/2000 |
| EP | 0553725 | 8/1993 |
| EP | 1126260 | 8/2001 |
| EP | 1528383 | 5/2005 |

OTHER PUBLICATIONS

EP Search Report dated Aug. 18, 2006.

* cited by examiner

*Primary Examiner*—Edward Lefkowitz
*Assistant Examiner*—Jermaine Jenkins
(74) *Attorney, Agent, or Firm*—Jimmy L. Funke

(57) ABSTRACT

A silicon-based high pressure sensor module incorporates a low temperature cofired ceramic (LTCC) substrate. The LTCC substrate can withstand high pressures. A bossed container filled with oil is mounted on the substrate and houses a sensor cell. The top surface of the bossed container is flexible and deflects under pressure. By controlling the surface area and the thickness of the top surface, the pressure sensor can be configured to measure a wide range of pressures. The oil transfers pressure from the bossed container to the diaphragm of the sensor cell while protecting the sensor cell from high pressures and harsh media.

15 Claims, 1 Drawing Sheet

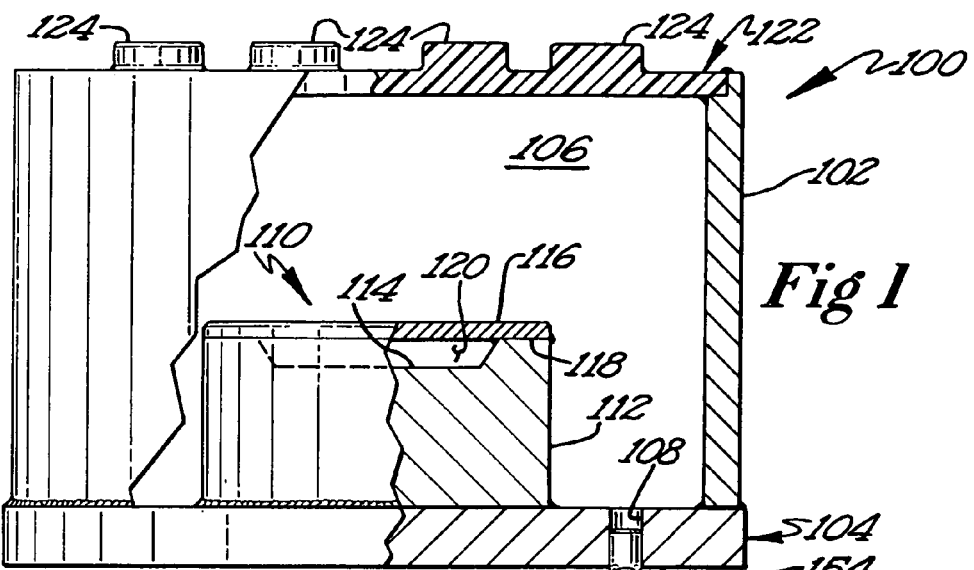
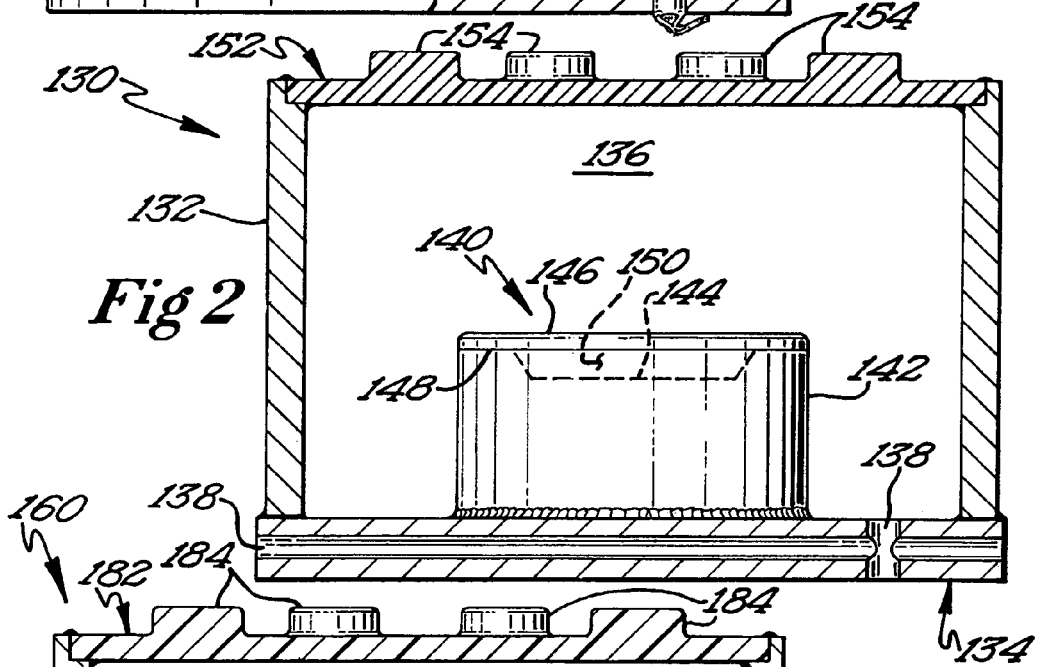
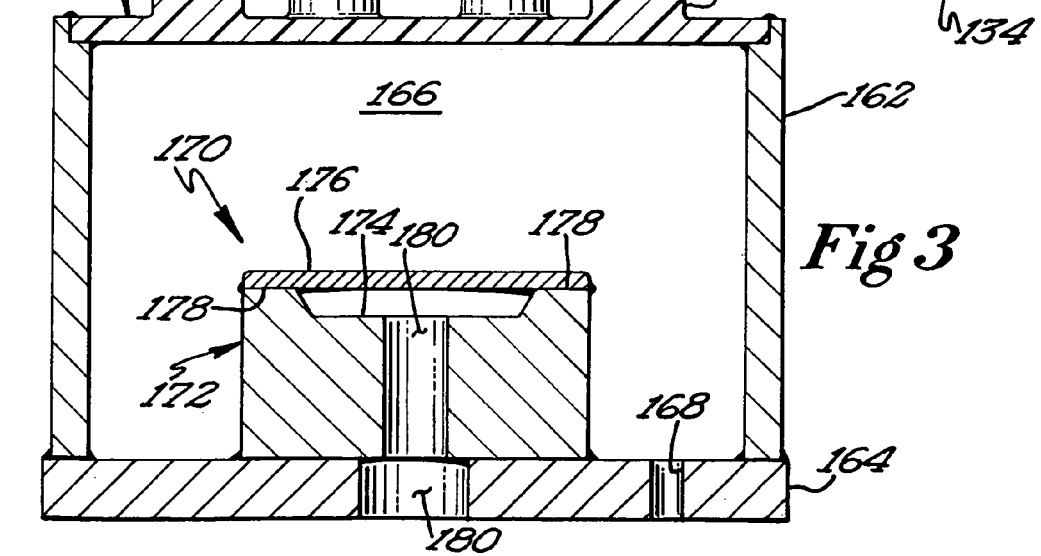

PRESSURE SENSOR ASSEMBLY

TECHNICAL FIELD

This disclosure relates generally to pressure sensors. More particularly, this disclosure relates to pressure sensors for use in high pressure or other harsh environments.

BACKGROUND OF THE DISCLOSURE

Certain vehicle control systems involve measuring pressure parameters, such as engine oil pressure, fuel pressure, transmission fluid pressure, or brake pressure. Silicon-based pressure sensors, for example, are used in a wide variety of automotive applications, including sensing manifold absolute pressure (MAP), turbo intake air pressure, and differential fuel vapor pressure. In addition, some occupant detection systems incorporate silicon-based pressure sensors.

Some silicon-based pressure sensors, known as absolute silicon-based pressure sensors, work by sensing a differential pressure across a thin silicon membrane or diaphragm within a cell body. The silicon membrane and cell body form a cavity that is hermetically sealed under a vacuum. This cavity establishes a reference pressure on one side of the membrane. The pressure sensor outputs a voltage that is proportional to the difference in pressure between the sensed pressure and the reference pressure. To provide acceptable service, the cell body and corresponding package must be able to withstand the environment.

In some absolute silicon-based pressure sensors, plastic packages with silicone adhesives are used to maintain the differential pressure across the diaphragm. These structures can be used when pressures are on the order of, for example, a few atmospheres. In high pressure or other harsh environments, however, media appropriate materials must be used for the packaging. Examples of such materials include, for example, solder, stainless steel, and ceramic. Some silicon-based pressure sensors use conventional ceramic, oil-filled TO cans as packaging materials that allow high pressure or other harsh environment operation. Using conventional manufacturing techniques, each sensor is manufactured serially, that is, one at a time.

SUMMARY OF VARIOUS EMBODIMENTS

According to various example embodiments, a silicon-based high pressure sensor module incorporates a low temperature cofired ceramic (LTCC) substrate or other suitable material. A container filled with oil is mounted on the substrate and houses a sensor cell. The container has a top flexible membrane that deflects under pressure. The substrate and the container can withstand the high pressures to which either or both may be exposed.

One embodiment is directed to a sensor assembly having a ceramic substrate and a container located on the ceramic substrate. The container has a flexible top surface that is configured to deflect under applied pressure. The container and the ceramic substrate define a container volume. A sensor cell is located within the container volume. The sensor cell includes a sensor handle wafer and a diaphragm located proximate the sensor handle wafer. The sensor cell defines a reference cavity. Oil or another appropriate incompressible liquid is disposed within the container volume.

In another embodiment, a pressure sensor arrangement includes a ceramic substrate and a container located on the ceramic substrate. The container has a flexible top surface configured to deflect under applied pressure and a boss formed on the top surface. The container and the ceramic substrate define a container volume. A silicon pressure sensor handle wafer is located within the container volume. A silicon diaphragm is located within the container volume and is attached to the silicon pressure sensor handle wafer so as to define a reference cavity located between the silicon diaphragm and the silicon pressure sensor handle wafer. Oil is disposed within the container volume.

Still another embodiment is directed to a method for manufacturing a plurality of sensor assemblies. A substrate material is provided. Containers are located on the substrate material in an array arrangement. Each container has a flexible top surface configured to deflect under applied pressure. The containers and the substrate material define a plurality of container volumes. Sensor cells are formed within each container volume. Each sensor cell comprises a sensor handle wafer and a diaphragm located proximate the sensor handle wafer. The sensor cell defines a reference cavity. Ports are formed in the substrate material. A substantially incompressible liquid is introduced within the container volumes via the ports, thereby forming the plurality of sensor assemblies in the array arrangement.

Various embodiments may provide certain advantages. For example, the flexible top surface of the bossed container deflects under pressure. By controlling the surface area and the thickness of the top surface, the pressure sensor can be configured to measure a wide range of pressures. In addition, the oil transfers pressure from the bossed container to the diaphragm of the sensor cell while protecting the sensor cell from high pressures and harsh media.

Additional objects, advantages, and features will become apparent from the following description and the claims that follow, considered in conjunction with the accompanying drawings.

BRIEF DESCRIPTION OF THE DRAWINGS

FIG. 1 is a sectional view illustrating an example sensor assembly according to an embodiment.

FIG. 2 is a sectional view illustrating an example sensor assembly according to another embodiment.

FIG. 3 is a sectional view illustrating an example sensor assembly according to yet another embodiment.

DESCRIPTION OF VARIOUS EMBODIMENTS

A silicon-based high pressure sensor module incorporates a low temperature cofired ceramic (LTCC) or other substrate. A container filled with oil is mounted on the substrate and houses a sensor cell. The top surface of the container is flexible and deflects under pressure, and may incorporate one or more bosses. The substrate and the container can withstand high pressures to which either or both may be exposed. By controlling the surface area and the thickness of the top surface, the pressure sensor can be configured to measure a wide range of pressures. The oil transfers pressure from the container to the diaphragm of the sensor cell while protecting the sensor cell from high pressures and harsh media.

In the following description, numerous specific details are set forth in order to provide a thorough understanding of various embodiments. It will be apparent to one skilled in the art that the described embodiments may be practiced without some or all of these specific details. In other instances, for purposes of brevity, well-known components and process steps have not been described in detail.

For purposes of this description, terms such as "upper," "lower," "right," "left," "rear," "front," "vertical," "horizontal," and the like relate to the embodiment as illustrated and oriented in FIG. 1. It is to be understood that various embodiments may assume alternative orientations, except where expressly specified to the contrary. It is also to be understood that specific devices and processes are described in this disclosure by way of illustration only, and are not intended to be limiting. For example, specific dimensions and other physical characteristics relating to the embodiments described in this disclosure are not to be considered as limiting, unless the claims expressly state otherwise.

Referring now to the drawings, FIG. 1 illustrates an example pressure sensor assembly 100 according to one embodiment. The pressure sensor assembly 100 includes a stainless steel can 102 mounted on a substrate 104. In some embodiments, the can 102 may be formed from another appropriate metal, such as aluminum or alloy 42. The substrate 104 may be formed from a ceramic material such as a low temperature cofired ceramic (LTCC), a polymer-based material such as FR-4, or another suitable material. In some embodiments, the can 102 is soldered to the substrate 104. Those of skill in the art will appreciate that the can 102 may be bonded to the substrate 104 by other means, for example, using any of a variety of adhesives and epoxies. These adhesives and epoxies may be either electrically conductive or electrically nonconductive.

The can 102 and the substrate 104 define a container volume 106. During manufacture, an oil, such as silicone, is introduced into the container volume 106 through a port 108. Other oils that can be used include, but are not limited to, fluorinated oil, low-temperature oil, and biocompatible oils. The oil is suitable for use in high pressure environments and provides general media compatibility. The port 108 can be formed in the substrate 104, as shown in FIG. 1, or can be formed on a wall of the can 102. The oil may be introduced into the container volume 106, for example, using a pinched and welded filling tube or other filling mechanism. Other filling mechanisms may involve horizontal and vertical port arrangements formed in the substrate 104 that allow the oil to be provided in plate form to many cells simultaneously, e.g., in an array configuration.

In this way, an array, or many-up, manufacturing configuration can be realized. This type of manufacturing configuration facilitates the simultaneous manufacture of pressure sensors in a manner analogous to the manufacture of silicon wafers containing many dies arranged in an array-like configuration. According to certain embodiments, high pressure sensors manufactured in a many-up configuration using LTCC or another suitable substrate material are subjected to pressure testing in a many-up configuration on the manufacturing line.

A sensor cell 110 is located within the container volume 106. The sensor cell includes a pressure sensor handle wafer 112, which may be implemented, for example, as a silicon piezoresistive pressure sensor or other suitable pressure sensor. A depression is formed on a surface 114 of the pressure sensor handle wafer 112. A silicon piezoresistive diaphragm 116 is bonded or otherwise attached to the pressure sensor handle wafer 112 at interfaces 118. The diaphragm 116 and the pressure sensor handle wafer 112 define a reference cavity 120, which is formed as a vacuum.

To maintain the performance of the diaphragm 116 within acceptable limits, the diaphragm 116 is protected from potential adverse effects of high pressure and harsh media. In particular, the can 102 has a top surface 122 that incorporates a flexible membrane that deflects under pressure. By controlling the surface area and thickness of the flexible membrane, the diaphragm 116 can be configured to measure a wide range of pressures.

In addition, while not required, one or more bosses 124 may be formed on the top surface 122. The bosses 124 may be used to help control the response of the top surface 122 to pressure. The oil in the container volume 106 provides the mechanism for transferring the pressure from the top surface 122 to the diaphragm 116. This arrangement may be compatible with difficult sensing environments, such as environments in which brake fluid pressure is sensed. The can 102 protects the diaphragm 116 from harsh effects of the environment, while the controlled response of the top surface 122 and the oil in the container volume 106 allow the pressure of the environment to be sensed.

As disclosed above, the substrate 104 may be formed from LTCC. LTCC is suitable for use in high pressure environments. Additionally, using LTCC facilitates adding integrated circuit (IC) components, discrete components, and internal components such as buried capacitors or internal cavities and channels, i.e., plumbing. Alternatively, the substrate 104 may be formed from a ceramic material, a polymer-based material such as FR-4, or some other suitable material. While not illustrated in FIG. 1, the substrate 104 may be populated by discrete components, integrated circuit (IC) components, or both to create a one-piece module suitable for use in high pressures and other harsh environments.

FIG. 1 illustrates a general absolute pressure sensor assembly. However, other types of sensors can be implemented using the principles disclosed herein. For example, a differential pressure sensor can be implemented by using a differential silicon pressure sensor cell that has appropriate ports formed in the pressure sensor assembly. Such ports may include, for example, a port similar to the port 108 shown in FIG. 1.

FIG. 2 is a sectional view illustrating an example pressure sensor assembly 130 according to another embodiment. The pressure sensor assembly 130 includes a stainless steel can 132 mounted on a substrate 134. In some embodiments, the can 132 may be formed from another appropriate metal, such as aluminum or alloy 42. The substrate 134 may be formed from a ceramic material such as a low temperature cofired ceramic (LTCC), a polymer-based material such as FR-4, or another suitable material. In some embodiments, the can 132 is soldered to the substrate 134. Those of skill in the art will appreciate that the can 132 may be bonded to the substrate 134 by other means, for example, using any of a variety of adhesives and epoxies. These adhesives and epoxies may be either electrically conductive or electrically nonconductive.

The can 132 and the substrate 134 define a container volume 136. During manufacture, an oil, such as silicone, is introduced into the container volume 136 through a port 138. Other oils that can be used include, but are not limited to, fluorinated oil, low-temperature oil, and biocompatible oils. The oil is suitable for use in high pressure environments and provides general media compatibility. In the embodiment depicted in FIG. 2, an internal plumbing system of substantially orthogonal ports 138 is formed in the substrate 134. This arrangement of ports 138 is suitable for manufacturing multiple pressure sensor assemblies 130 in an array or many-up manufacturing configuration because it allows the oil to be introduced into multiple pressure sensor assemblies 130 from a single source. The oil may be introduced into the container volume 136, for example, using a pinched and welded filling tube or other filling mechanism.

In this way, an array, or many-up, manufacturing configuration can be realized. This type of manufacturing configuration facilitates the simultaneous manufacture of pressure sensors in a manner analogous to the manufacture of silicon wafers containing many dies arranged in an array-like configuration. According to certain embodiments, high pressure sensors manufactured in a many-up configuration using LTCC or another suitable substrate material are subjected to pressure testing in a many-up configuration on the manufacturing line.

A sensor cell 140 is located within the container volume 136. The sensor cell includes a pressure sensor handle wafer 142, which may be implemented, for example, as a silicon piezoresistive pressure sensor or other suitable pressure sensor. A depression is formed on a surface 144 of the pressure sensor handle wafer 142. A diaphragm 146 is bonded or otherwise attached to the pressure sensor handle wafer 142 at interfaces 148. The diaphragm 146 and the pressure sensor handle wafer 142 define a reference cavity 150, which is formed as a vacuum.

To maintain the performance of the diaphragm 146 within acceptable limits, the diaphragm 146 is protected from potential adverse effects of high pressure and harsh media. In particular, the can 132 has a top surface 152 that incorporates a flexible membrane that deflects under pressure. By controlling the surface area and thickness of the flexible membrane, the diaphragm 146 can be configured to measure a wide range of pressures.

In addition, while not required, one or more bosses 154 may be formed on the top surface 152. The bosses 154 may be used to help control the response of the top surface 152 to pressure. The oil in the container volume 136 provides the mechanism for transferring the pressure from the top surface 152 to the diaphragm 146. This arrangement may be compatible with difficult sensing environments, such as environments in which brake fluid pressure is sensed. The can 132 protects the diaphragm 146 from harsh effects of the environment, while the controlled response of the top surface 152 and the oil in the container volume 136 allow the pressure of the environment to be sensed.

As disclosed above, the substrate 134 may be formed from LTCC. LTCC is suitable for use in high pressure environments. Additionally, using LTCC facilitates adding IC components, discrete components, and internal components such as buried capacitors or internal cavities and channels, i.e., plumbing. Alternatively, the substrate 134 may be formed from a ceramic, a polymer-based material such as FR-4, or some other suitable material. While not illustrated in FIG. 2, the substrate 134 may be populated by discrete components, IC components, or both to create a one-piece module suitable for use in high pressures and other harsh environments.

FIG. 3 is a sectional view illustrating an example differential pressure sensor assembly 160 according to yet another embodiment. The pressure sensor assembly 160 includes a stainless steel can 162 mounted on a substrate 164. In some embodiments, the can 162 may be formed from another appropriate metal, such as aluminum or alloy 42. The substrate 164 may be formed from a ceramic material, for example, LTCC, a polymer-based material such as FR-4, or another suitable ceramic material. In some embodiments, the can 162 is soldered to the substrate 164. Those of skill in the art will appreciate that the can 162 may be bonded to the substrate 164 by other means, for example, using any of a variety of adhesives and epoxies. These adhesives and epoxies may be either electrically conductive or electrically nonconductive.

The can 162 and the substrate 164 define a container volume 166. During manufacture, an oil, such as silicone, is introduced into the container volume 166 through a port 168. Other oils that can be used include, but are not limited to, fluorinated oil, low-temperature oil, and biocompatible oils. The oil is suitable for use in high pressure environments and provides general media compatibility. The oil may be introduced into the container volume 166, for example, using a pinched and welded filling tube or other filling mechanism.

A sensor cell 170 is located within the container volume 166. The sensor cell includes a pressure sensor handle wafer 172, which may be implemented, for example, as a silicon piezoresistive pressure sensor or other suitable pressure sensor. A depression is formed on a surface 174 of the pressure sensor handle wafer 172. A diaphragm 176 is bonded or otherwise attached to the pressure sensor handle wafer 172 at interfaces 178. A differential port 180 is formed within the pressure sensor handle wafer 172 and the substrate 164 and beneath the diaphragm 176. In operation, the differential pressure sensor assembly 160 measures the differential pressure between the ambient environment and another environment in communication with the differential port 180.

To maintain the performance of the diaphragm 176 within acceptable limits, the diaphragm 176 is protected from potential adverse effects of high pressure and harsh media. In particular, the can 162 has a top surface 182 that incorporates a flexible membrane that deflects under pressure. By controlling the surface area and thickness of the flexible membrane, the diaphragm 176 can be configured to measure a wide range of pressures.

In addition, while not required, one or more bosses 184 may be formed on the top surface 182. The bosses 184 may be used to help control the response of the top surface 182 to pressure. The oil in the container volume 166 provides the mechanism for transferring the pressure from the top surface 182 to the diaphragm 176. This arrangement may be compatible with difficult sensing environments, such as environments in which brake fluid pressure is sensed. The can 162 protects the diaphragm 176 from harsh effects of the environment, while the controlled response of the top surface 182 and the oil in the container volume 166 allow the pressure of the environment to be sensed.

As disclosed above, the substrate 164 may be formed from LTCC. LTCC is suitable for use in high pressure environments. Additionally, using LTCC facilitates adding IC components, discrete components, and internal components such as buried capacitors or internal cavities and channels, i.e., plumbing. Alternatively, the substrate 164 may be formed from a ceramic, a polymer-based material such as FR-4, or some other suitable material. While not illustrated in FIG. 3, the substrate 164 may be populated by discrete components, IC components, or both to create a one-piece module suitable for use in high pressures and other harsh environments.

As demonstrated by the foregoing discussion, various embodiments may provide certain advantages. For instance, the flexible top surface of the bossed container deflects under pressure. By controlling the surface area and the thickness of the top surface, the pressure sensor can be configured to measure a wide range of pressures. In addition, the oil transfers pressure from the bossed container to the diaphragm of the sensor cell while protecting the sensor cell from high pressures and harsh media.

It will be understood by those skilled in the art that various modifications and improvements may be made without departing from the spirit and scope of the disclosed embodiments. The scope of protection afforded is to be determined solely by the claims and by the breadth of interpretation allowed by law.

What is claimed is:

1. A sensor assembly comprising:
    a ceramic substrate;
    a container located on the ceramic substrate and having a flexible top surface configured to deflect under applied pressure, the container and the ceramic substrate defining a container volume;
    a sensor cell mounted on the substrate and located within the container, the sensor cell comprising a sensor handle wafer and a diaphragm located proximate the sensor handle wafer, the sensor cell defining a reference cavity; and
    a substantially incompressible liquid disposed within the container volume;
    wherein the ceramic substrate defines a port for introducing the substantially incompressible liquid into the container volume.

2. The sensor assembly of claim 1, wherein the substantially incompressible liquid comprises an oil selected from the group consisting of silicone, fluorinated oil, low-temperature oil, and a biocompatible oil.

3. The sensor assembly of claim 1, wherein the container is formed from a material selected from the group consisting of stainless steel, aluminum, and alloy 42.

4. The sensor assembly of claim 1, wherein the ceramic substrate is formed from a low temperature cofired ceramic (LTCC) material.

5. The sensor assembly of claim 1, wherein the sensor comprises a general absolute pressure sensor.

6. The sensor assembly of claim 1, wherein the sensor comprises a harsh media pressure sensor.

7. The sensor assembly of claim 1, wherein the sensor comprises a differential pressure sensor.

8. The sensor assembly of claim 1, wherein the container comprises a boss formed on the top surface of the container.

9. A pressure sensor arrangement comprising:
    a ceramic substrate;
    a container located on the ceramic substrate and having a flexible top surface configured to deflect under applied pressure and a boss formed on the top surface, the container and the ceramic substrate defining a container volume;
    a silicon pressure sensor handle wafer mounted on the ceramic substrate and located within the container;
    a silicon diaphragm located within the container volume and attached to the silicon pressure sensor handle wafer so as to define a reference cavity located between the silicon diaphragm and the silicon pressure sensor handle wafer; and
    oil disposed within the container volume;
    wherein the ceramic substrate defines a port for introducing the oil into the container volume.

10. The pressure sensor arrangement of claim 9, wherein the oil is selected from the group consisting of silicone, fluorinated oil, low-temperature oil, and a biocompatible oil.

11. The pressure sensor arrangement of claim 9, wherein the container is formed from a material selected from the group consisting of stainless steel, aluminum, and alloy 42.

12. The pressure sensor arrangement of claim 9, wherein the ceramic substrate is formed from a low temperature cofired ceramic (LTCC) material.

13. The pressure sensor arrangement of claim 9, wherein the silicon pressure sensor is configured to measure general absolute pressure.

14. The pressure sensor arrangement of claim 9, wherein the sensor comprises a harsh media pressure sensor.

15. The pressure sensor arrangement of claim 9, wherein the silicon pressure sensor is configured to measure a differential pressure.

* * * * *